Feb. 14, 1933.   W. W. WILSON   1,897,094
TRUNK RACK
Filed Sept. 16, 1929   3 Sheets-Sheet 1

Witness
Ralph Collins

Inventor
William W. Wilson
by Bair, Freeman & Sinclair
Attorneys

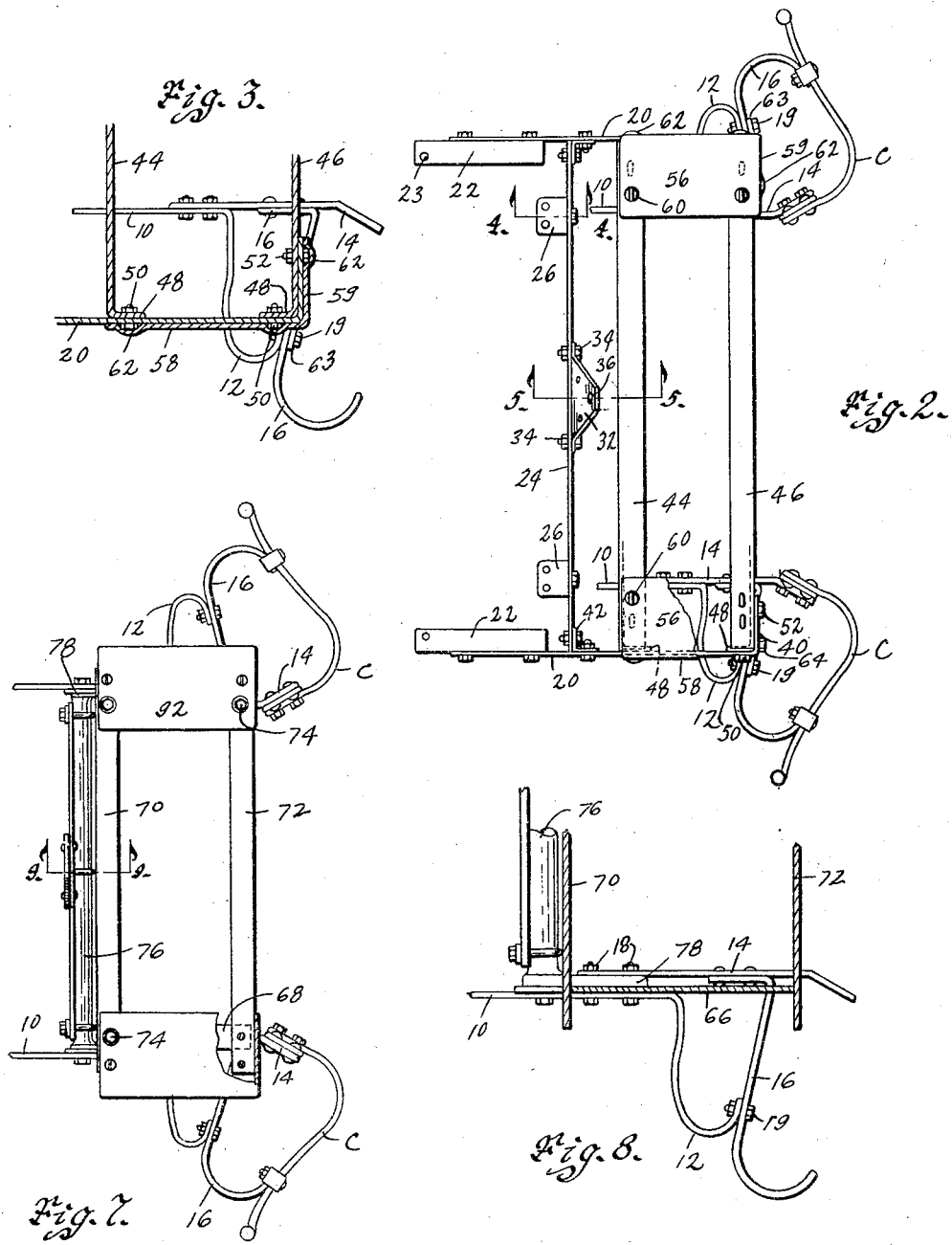

Feb. 14, 1933.    W. W. WILSON    1,897,094
TRUNK RACK
Filed Sept. 16, 1929    3 Sheets-Sheet 3

Witness
Ralph Collins

Inventor
William W. Wilson
by Bair, Freeman & Sinclair
Attorneys

Patented Feb. 14, 1933

1,897,094

UNITED STATES PATENT OFFICE

WILLIAM W. WILSON, OF SIOUX CITY, IOWA, ASSIGNOR, BY MESNE ASSIGNMENTS, TO THE GABRIEL KARI-KEEN COMPANY, A CORPORATION OF DELAWARE

TRUNK RACK

Application filed September 16, 1929. Serial No. 392,960.

This invention relates to an automobile trunk rack adapted for attachment to the rear end of an automobile, the parts being simple, durable and comparatively inexpensive.

An object of the invention is to provide a trunk rack which is especially applicable for use on automobiles having rearwardly extending bumper arms or bars such as in the Ford automobile of the 1928 model; the present invention contemplating the use of such bumper arms as a means of attachment for the trunk rack and at the same time providing a support for bumper elements.

Still a further object is to provide a trunk rack structure adapted to be supported at its ends upon members projecting rearwardly from the automobile body or frame and adapted for connection intermediate its ends to the body portion of the automobile so that the trunk rack is supported both at its ends and at a point intermediate its ends.

It may be here mentioned that in the Ford automobile of the 1928 model, there is provided a spare tire support which consists of a casting rigidly connected to the rear of the automobile body at a point substantially midway between the fenders of the automobile. My trunk rack is adapted to be supported intermediate its ends by means of a connection extending from the trunk rack up to the body where the spare tire support normally is positioned.

Another object is to provide a construction in a trunk rack whereby the rack, while being supported at its ends on brackets extended from the vehicle frame, will also be securely affixed to the vehicle body and to the rear end frame member of the chassis in such manner as to afford a strong and substantial carrier for loads imposed thereon.

Still a further object is to provide bumper adaptors adapted to be positioned upon the bumper bar for projecting the bumper rearwardly a greater distance than the normal distance of the bumper elements so as to accommodate the trunk rack between the rear of the automobile and the position of the bumper elements.

Another object is to provide a trunk rack of the character described embodying a frame structure and a means of attachment to the rear end of an automobile which consists of few parts that may be readily constructed and assembled, which may be easily applied, and which is strong and durable.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 2 is a top plan view of my trunk rack structure.

Figure 3 is a detail sectional view taken on line 3—3 of Figure 1.

Figure 7 is a top plan view of the same.

Figure 8 is a detail sectional view taken on line 8—8 of Figure 6; and

Figure 1:
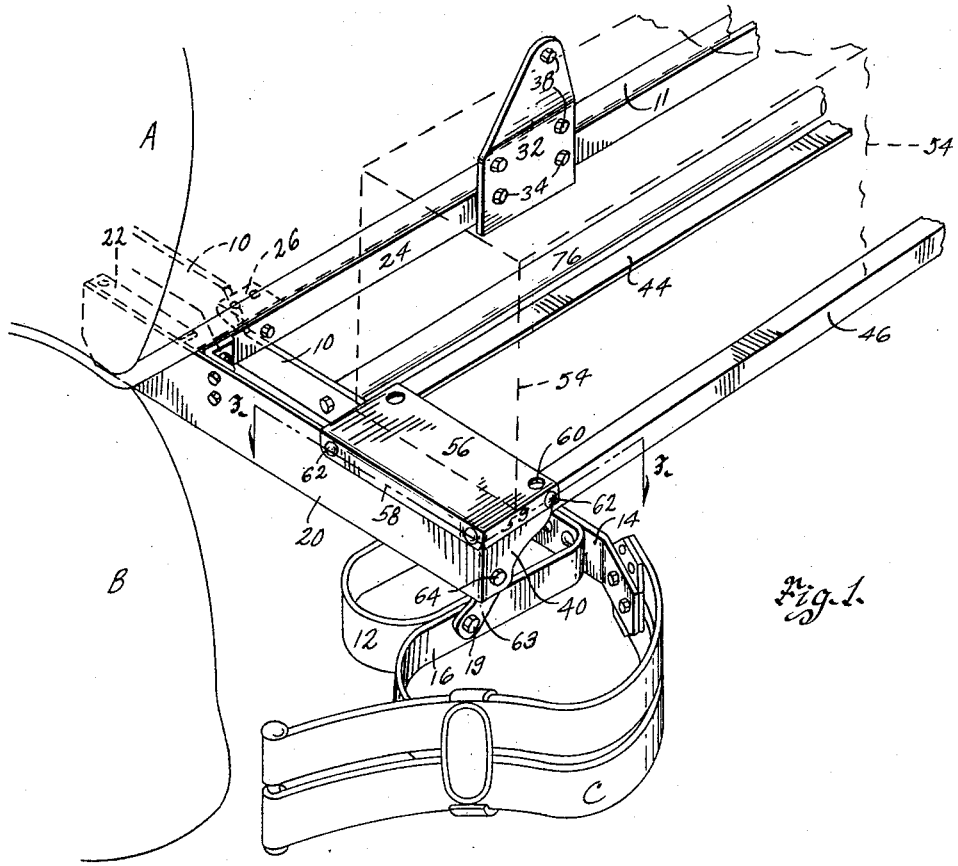
Figure 1 is a fragmentary perspective view of one end of the trunk rack showing the manner of mounting the same upon an automobile with the bumper member attached rearwardly of the trunk rack.

In the accompanying drawings, I have used the reference character A to indicate generally, the body of an automobile and B the fenders thereof. The body A includes a chassis or under-frame 11.

My trunk rack structure is composed of structural steel parts, that is angle irons and flat plates so connected together as to provide a rigid unit.

The ordinary Ford car of the 1928 type includes a pair of rearwardly extending bumper bars or supports 10. The supports 10 have their outer ends curved outwardly as at 12 and bumper elements C are connected to the straight portion of the bumper bar 10 and to the outwardly curved portion 12.

When my trunk structure is used, it is necessary to provide an adaptor for positioning the bumper elements C rearwardly a greater distance than their normal position relative to the rear of the automobile body.

The adaptors include a plate-member consisting of a straight element of strap material 14 and an outwardly projecting portion 16. The straight portion 14 is bolted to the bumper support 10 by means of a pair of bolts 18. The bolts 18 are those normally provided for connecting the bumper element C to the support 10.

The portion 16 of the adaptor is bolted to the portion 12 of the bumper support 10 by a bolt 19. The ends of the straight portion 14 and of the curved portion 16 are provided with bolt holes or openings so that the bumper element C may be secured thereto by the use of bolts. It will thus be seen that the adaptor composed of the parts 14 and 16 does nothing more than place the position of the bumper element C a greater distance rearwardly than that of the automobile body proper.

The trunk rack structure includes a pair of side plates 20 having angle irons or the like 22 secured thereto at their forward ends. The angle pieces 22 are adapted for connection with the under-frame of the automobile body A. A strap iron or connecting member 24 connects the two side plates 20 together.

A pair of angle fastening elements 26 are so positioned as to be connected to the under-frame 11 of the automobile body at points where the bumper bars 10 are normally connected to the body.

Figures 4, 5:
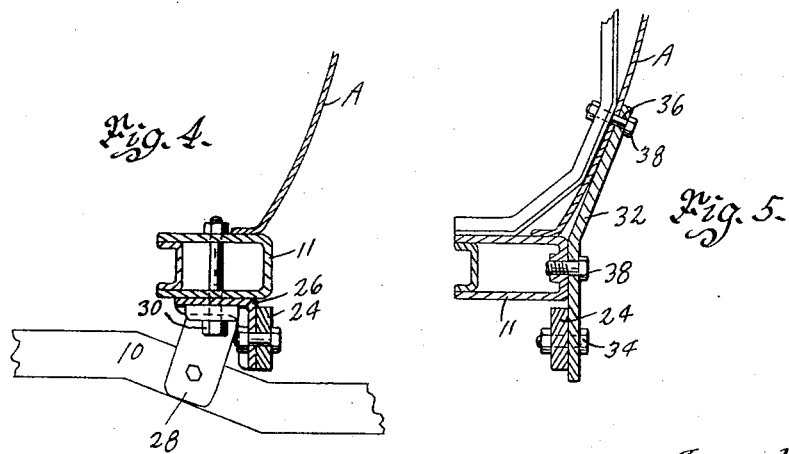
Figure 4 is a detail sectional view taken on line 4—4 of Figure 2, illustrating one of the intermediate attaching members between the trunk rack structure and the body of the automobile.
Figure 5 is a detail sectional view taken on line 5—5 of Figure 2, illustrating the attachment of the trunk rack to the body at the point where the tire carrier is usually mounted.

The bumper bars 10 are supported intermediate their ends by brackets 28 and what I do is to remove the bracket 28 and place the fastening elements 26 between the bracket and the body A and thereafter position the bolts 30. All this is clearly illustrated in Figure 4 of the drawings.

I also remove the spare tire carrier from the automobile body and connect the center portion of the brace 24 at points where the normal spare tire carrier is mounted.

A fitting 32 is bolted or otherwise fastened to the brace bar 24 and is provided with a series of openings 36, which coincide with a series of openings formed in the automobile body and bolts or screws 38 are used for connecting the fitting 32 to the automobile body and extend through the openings 36. A pair of bolts 34 are used for connecting the fitting 32 to the brace bar 24.

The outer or rear ends of the flat supporting plates 20 are bent inwardly or at right angles to their major body portion so as to provide inturned ends 40. The cross brace or bar 24 is fixedly connected to the side plates 20 by means of angle connections 42. Extending transversely between the two side plates 20 are a pair of angle iron cross pieces 44 and 46. The angle iron cross pieces 44 and 46 have their ends cut away and bent over so as to provide marginal fastening flanges 48. The flanges 48 have bolts 50 extending therethrough for connecting the angle irons 44 and 46 to the side plates 20.

The inturned flange 40 on each plate is also connected by a bolt 52 to the angle bar 46. It will thus be seen that a rigid trunk rack structure is composed of side plates 20, cross brace 24 and a pair of angle iron supports 44 and 46.

The trunk structure illustrated by dotted lines 54 in Figure 1 of the drawings rests upon the angle irons 44 and 46. Due to the fact that the trunk itself is not quite as long as the distance between the two plates 20, I provide a cover plate 56 which is formed with a pair of downturned flanges 58 and 59 extending over the corner of the plate 20 and provided with embossed portions 62 to extend over and conceal the heads of the bolts 50 and 52.

Openings are provided in the cover plates 56 and likewise in the angle bars 44 and 46 as at 60 so that the trunk may be bolted in position. It will be noted from Figures 1, 2 and 3 that the trunk rack structure overhangs the adaptors or plate-members composed of the straight portions 14 and outwardly projecting portions 16. In order to support the forward outer ends of the trunk rack structure upon the bumper bars, I provide an upstanding brace 63, which is connected to the plate 20 as at 64 and to the adaptor piece 16 and to the curved portion 12 of the bumper support 10 by means of the bolt 19.

It will thus be seen that my trunk rack structure is adapted to be supported intermediate its ends at the rear portion of the automobile and at its end portions on the bumper member.

Figure 6:
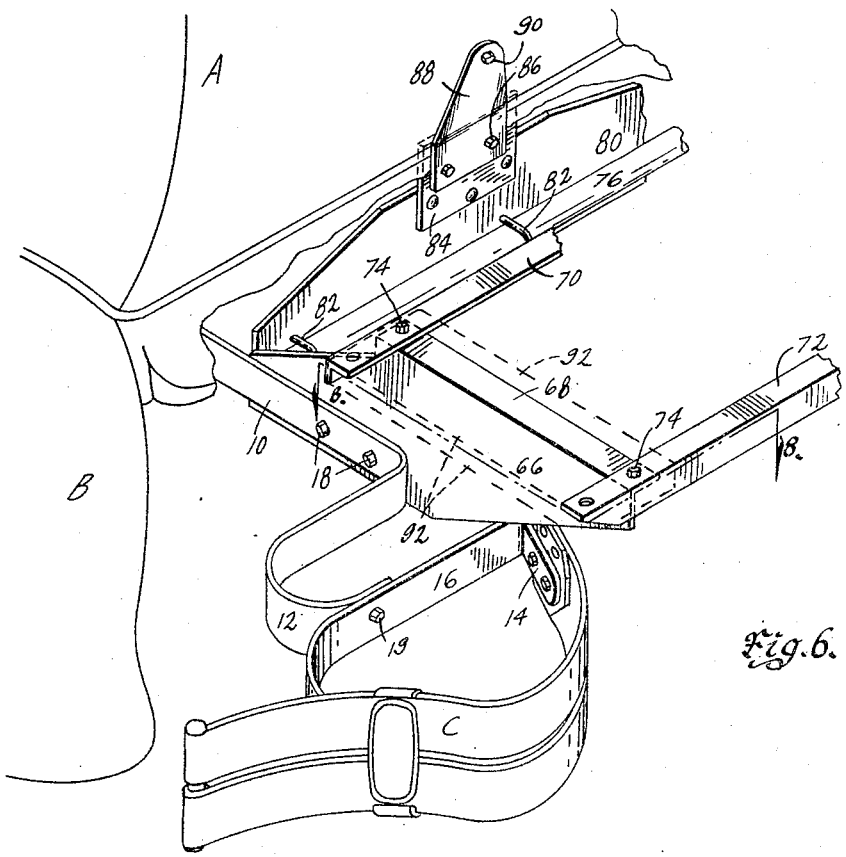
Figure 6 is a perspective view of a slightly modified form of trunk rack structure, illustrating a direct connection of the trunk rack structure with the bumper bar or support.
Figure 9:
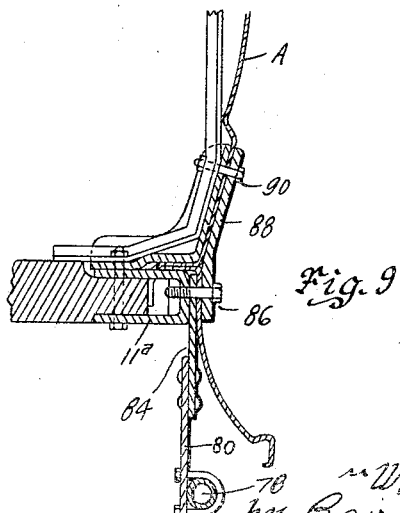
Figure 9 is a sectional view taken on line 9—9 of Figure 7.

In Figure 6, I have shown a slightly modified form of trunk rack structure in which a pair of side plates 66 are employed having inturned flanges 68. The side plates 66 are secured together by a pair of angle bars 70 and 72. Bolts 74 are used for connecting the angle bars 70 and 72 to the side plates 66. The side plates are adapted to be connected to the bumper bar 10 by means of the bolts 18.

Secured to the bumper bar 10 through the medium of the bolts 18 is the adaptor composed of the parts 14 and 16. Extending between the bumper bars or supports 10 is a pipe or brace 76 which is formed with a pair of legs 78 adapted to register with the bolts 18 so that they may pass therethrough as clearly shown in Figure 8 of the drawings.

In order to connect the trunk rack structure to the body of the automobile, I provide a plate 80, which is vertically arranged and connected to the pipe 76 by several U-bolts 82. Extending upwardly from the plate 80 is a plate or fitting 84. The fitting 84 is provided with a pair of openings adapted to receive bolts or screws 86.

An auxiliary cover plate 88 substantially triangular in outline is positioned on the back side of the automobile body and connected thereto by the bolts 86 as well as a third bolt 90. The bolts 86 and 90 project into and connect with the body at the point where the normal tire carrier or support is provided.

It will be noted that the bolts 86 project through the cover plate 88 as well as the fitting 84. It will thus be seen that through the medium of the plate 80 and fitting 84 that I connect the trunk rack structure intermediate its ends to the body of the automobile. The ends of the angle irons 70 and 72 project beyond the side plates 66 and I provide a cover element 92, as clearly illustrated in Figure 7 of the drawings.

It will be noted that my trunk rack structure is adapted to be secured to an automobile and to cooperate with the bumper supports thereof which serve as a means of connection and support for the trunk rack structure.

Both forms of the trunk rack structure are supported at their ends on the rearwardly extending members 10 and at their centers by the plates which are adapted to be secured to the automobile body at the position where the spare tire carrier is normally attached. The central or intermediate support in conjunction with the end supports on the bumper bars 10 provide a very rigid supporting construction for the trunk 54.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In combination with an automobile having rearwardly extending members formed at their extremities with a horizontally curved portion, a rearward extension to the straight portion of said rearwardly extending member, a trunk rack structure adapted to be attached to the rear portion of the body of the automobile to form a major support therefor, resilient bumpers connected at their inner ends of said rearward extensions and supported intermediate of their ends by a resilient member attached to said horizontal curved portion of said rearwardly extending member, and means connecting the rearward end of said rearward extension to the end portions of said trunk rack structure.

2. In combination with an automobile having rearwardly extending members formed at their extremities with a horizontally curved portion, a rearward extension to the straight portion of said rearward extending member, a trunk rack structure adapted to be attached to the rear portion of the body of the automobile to form a major support therefor, resilient bumpers connected at their inner ends to said rearward extensions and supported intermediate of their ends by a resilient member attached to said horizontal curved portion of said rearwardly extending member, and means connecting the rearward end of said rearward extension to the end portions of said trunk rack structure, said bumpers starting at a point adjacent the end of the trunk rack structure and curving rearwardly and outwardly therefrom to a terminating point substantially even with the outer edge of the fenders of the automobile.

3. In combination with an automobile having rearwardly extending members, a trunk rack structure adapted to be supported by the rear central portion of the automobile and by said rearwardly extending members.

4. In combination with an automobile having rearwardly extending members, a trunk rack structure adapted to be supported by the rear central portion of the automobile and said rearwardly extending members, and resilient bumpers mounted upon said rearwardly extending members and positioned rearward of the trunk rack.

5. In combination with an automobile, a pair of brackets extending rearwardly from the automobile frame, extensions on said brackets, a trunk rack extending over said brackets and extensions, means connecting the end portions of said rack to said extensions, and supporting means secured to the automobile and to said rack intermediate its ends.

6. In combination with an automobile having a pair of rearwardly extending members, a trunk rack structure comprising a pair of transversely arranged supporting bars, end elements connecting the ends of said bars together, said end elements being secured to said rearwardly extending members and supported thereby and an intermediate support for said trunk rack, said intermediate support being secured to the back of said automobile body.

7. In combination with an automobile having a pair of rearwardly extending members, a trunk rack structure comprising a pair of transversely arranged supporting bars, end elements connecting the ends of said bars together, said end elements being secured to said rearwardly extending members and supported thereby, a brace rod between the ends of said trunk rack and an intermediate support for said trunk rack, said intermediate support being secured to the back of said automobile body and to said brace rod for supporting the brace rod and thereby the trunk rack.

8. In combination with an automobile having a pair of rearwardly extending members, a trunk rack structure comprising a pair of transversely arranged supporting bars, end elements connecting the ends of said bars together, said end elements being secured to said rearwardly extending members and supported thereby, a brace rod between the ends of said trunk rack and an intermediate support for said trunk rack, said intermediate support being secured to the back of said automobile body and to said brace rod for supporting the brace rod and thereby the trunk rack, the connection of said intermediate support to said brace rod being by U-bolts.

9. A combination carrier device for an automobile, comprising two parallel bars adapted to extend rearwardly from the frame of the automobile, a pair of laterally extending bumper units positioned rearwardly of and supported by the rear ends of said bars, a horizontal trunk-rack positioned above the rear ends of said bars, said rack being provided at the front end thereof with means for attachment to the body of the automobile, and means for supporting the rear end of the rack.

10. A combination carrier device for an automobile, comprising two parallel bars adapted to extend rearwardly from the frame of the automobile, a pair of laterally extending bumper units positioned rearwardly of and supported by the rear ends of said bars, a horizontal trunk-rack positioned above the rear ends of said bars, said rack being provided at the front end thereof with bolts for attachment to the body of the automobile and vertical extending leg-members depending from the rear end of said rack.

WILLIAM W. WILSON.